United States Patent [19]

Bookout

[11] 4,424,788
[45] Jan. 10, 1984

[54] FUEL APPARATUS

[76] Inventor: Leonard M. Bookout, P.O. Box 270, Livingston, Mont. 59047

[21] Appl. No.: 436,830

[22] Filed: Oct. 26, 1982

[51] Int. Cl.³ .............................................. F02M 31/00
[52] U.S. Cl. .................................... 123/557; 123/525; 165/52
[58] Field of Search ........................ 123/557, 525, 527; 165/52

[56] References Cited

U.S. PATENT DOCUMENTS

| | | | |
|---|---|---|---|
| 400,850 | 4/1889 | Humes | 123/557 |
| 1,273,363 | 7/1918 | Hale | 165/52 |
| 1,386,544 | 8/1921 | Wolff | 123/557 |
| 1,436,379 | 11/1922 | Chapman | 165/52 |
| 1,970,425 | 8/1934 | Grabbe | 123/525 |
| 2,061,600 | 11/1936 | Spencer | 123/557 |
| 2,625,920 | 1/1953 | Farrell | 123/557 |
| 4,099,499 | 7/1978 | Giardini | 123/557 |

FOREIGN PATENT DOCUMENTS

618822 4/1961 Canada .............................. 123/557

*Primary Examiner*—Ronald H. Lazarus
*Attorney, Agent, or Firm*—Arthur L. Urban

[57] ABSTRACT

Fuel apparatus including a housing portion, a fuel treating portion, a fuel metering portion and a flow control portion; the housing portion including a main chamber, an upper expansion chamber and first and second lower expansion chambers, the main chamber including an inlet connectable to an exhaust gas source of an internal combustion engine, an outlet for venting the exhaust gas to the atmosphere; the fuel treating portion including first and second conduit coils disposed within the main chamber, each of the conduit coils including an inlet and an outlet, the inlet of the first coil communicating with the first lower expansion chamber and the outlet of the first coil communicating with the second lower expansion chamber, the inlet of the second coil communicating with the second lower expansion chamber and the outlet of the second coil communicating with the upper expansion chamber, inlet mechanism for delivering liquid fuel into the first lower expansion chamber, the inlet mechanism including a vacuum source and mechanism for bleeding a small amount of atmospheric air into a liquid fuel stream at a point adjacent to the inlet of the first lower expansion chamber, outlet mechanism for delivering vaporized fuel from the upper expansion chamber; the fuel metering portion including a body section, a bore extending through the body section, a rotatable member extending into the bore, an external section of the rotatable member being operatively connectable to carburetor controls of the engine, a vaporized fuel inlet and outlet communicating with the bore; the flow control portion including mechanism for controlling the flow of liquid fuel into the first lower expansion chamber.

11 Claims, 5 Drawing Figures

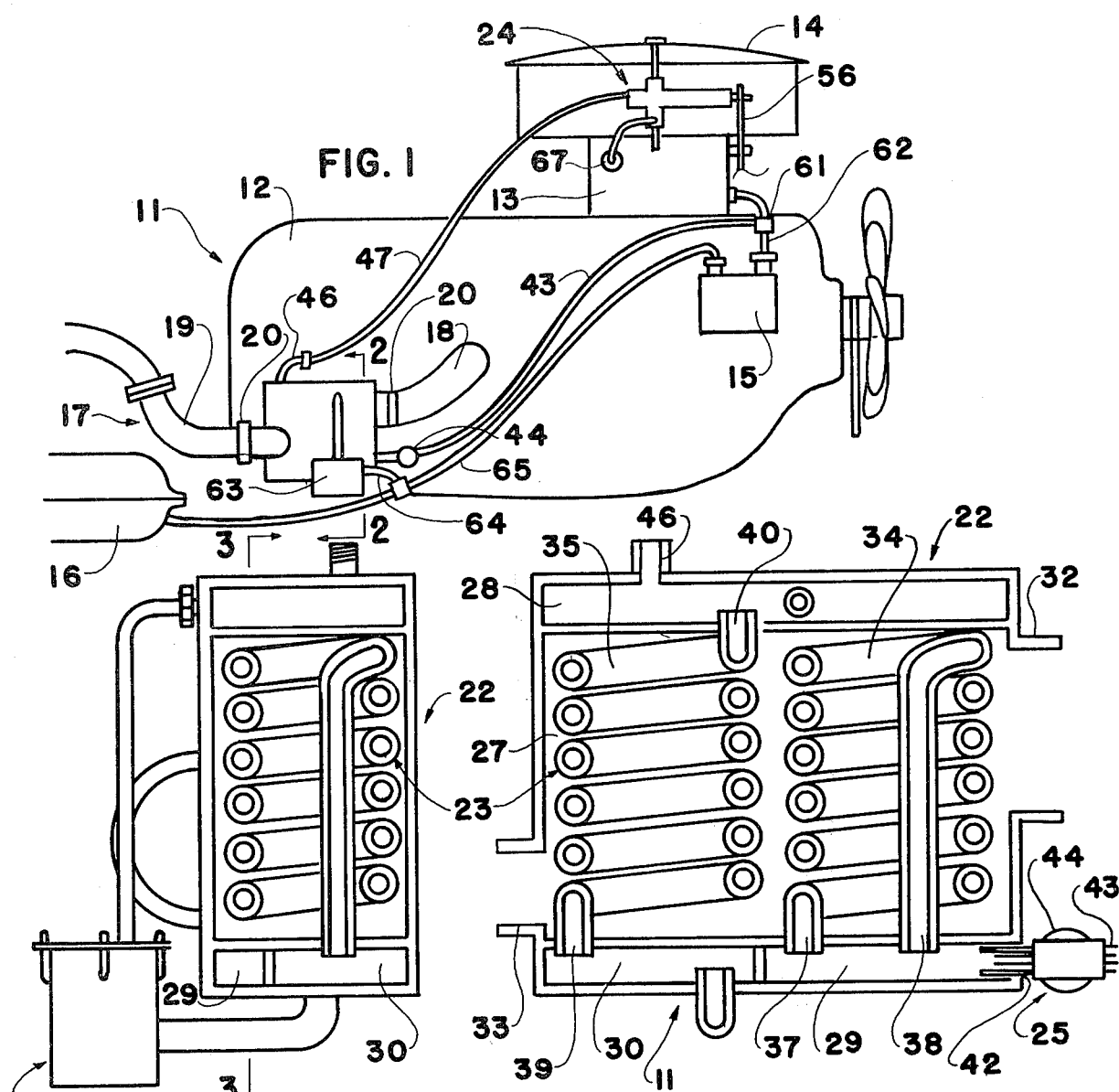
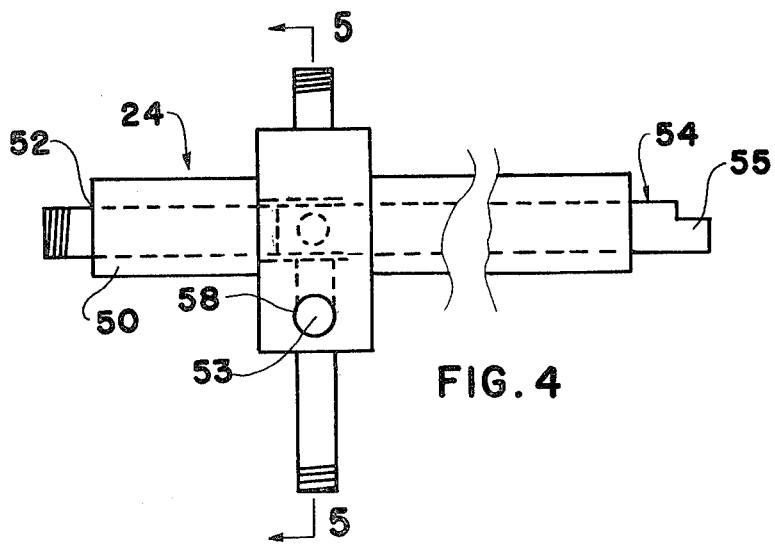
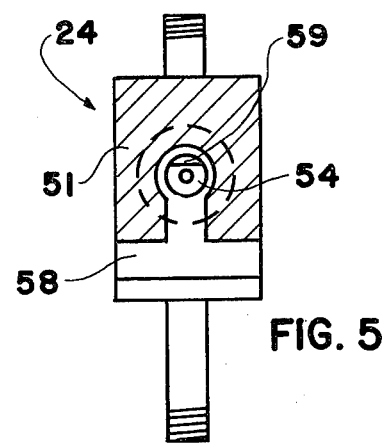

FUEL APPARATUS

This invention relates to a novel apparatus for combustion devices and more particularly relates to a new apparatus for fuel used with combustion devices.

Combustible materials have been burned through the years for a variety of purposes. Materials such as wood, coal, oil, gasoline, natural gas, liquified propane gas and the like have been burned under many different conditions. Frequently, fuels are burned to provide heat. For heating purposes, fuels have been burned in open areas, fireplaces, stoves, furnaces and the like. Some fuels such as gasoline and oil are used to power vehicles, e.g. cars, trucks, tractors and other motorized equipment.

When fuels were inexpensive, fuel users were not greatly concerned about their fuel costs. Instead, people were more concerned about the amount of power that they could obtain from a particular piece of equipment. For example, with vehicles, people were concerned about the speed that could be achieved by a vehicle or the torque obtainable from the vehicle engine.

As fuels have become much more costly with the recent multifold price increases, many individuals have become increasingly concerned about fuel expenses. In the case of vehicles, owners have reduced the amount that they use their vehicles. Also, many individuals have traded their older vehicles for others that are smaller in size and/or weight to reduce fuel costs.

Although these experiments have provided a reduction in fuel consumption, continuing increases in the price of fuel have caused many people to direct considerable attention toward finding additional ways of further reducing the consumption of fuel. However, these efforts have had only limited success.

Vehicle owners cannot purchase smaller and smaller vehicles. At some size, a vehicle loses its utility for the owner's purposes. Thus, each owner is only willing to accept a certain minimum size vehicle.

As a result, major efforts are being made to analyze the design and operating characteristics of engines in an attempt to improve the combustion efficiency of such devices. While these efforts have produced some improvements, there still is a critical need for further improvements in the fuel efficiency of combustion devices.

One of the problems with many of the ideas proposed to date is that they require the expenditures of large amounts of money to achieve the benefits thereof. Most necessitate the purchase of new equipment or the extensive modification of existing equipment. Although it may be possible or justifiable to take such radial measures in a limited number of cases, for many situations such actions may not be justifiable.

Another factor that has limited the acceptance of new devices for improving fuel consumption of engines is that many devices are only useful under certain operating conditions. For example, the devices may be beneficial only if the operator is willing to accept limitations on acceleration, torque and similar performance characteristics. On the other hand, if acceleration and power are not sacrificed, the equipment required may be so large in size that it cannot fit under the hood of a vehicle when it is mounted on the engine.

From the above discussion, it is clear that previous devices for improving the fuel consumption of engines have left much to be desired. As a result, many persons have had to accept compromise solutions in attempts to improve their fuel consumption.

The present invention provides a novel apparatus for reducing the fuel consumption of engines. The fuel apparatus of the invention provides an inexpensive means for achieving this reduction in fuel consumption. The apparatus can be used with different types of engines operating under a wide variety of conditions. Acceleration and power are not sacrificed with the apparatus of the invention.

The fuel apparatus of the present invention is simple in design and relatively small in size. The apparatus can be mounted on an engine conveniently within the space limitations encountered under the hood of a vehicle. The apparatus can be installed on an engine after only a minimum of instruction without special tools or skills. The apparatus is durable in construction and has a long useful life with little maintenance.

The fuel apparatus is used by a vehicle operator without changing his normal driving procedures. The apparatus can function automatically without attention from the driver if desired.

The apparatus can be fabricated from commercially available materials and components. Conventional metal working techniques and procedures and semi-skilled labor can be employed in its manufacture.

These and other benefits and advantages of the novel fuel apparatus of the present invention will be apparent from the following description and the accompanying drawings in which:

FIG. 1 is a side elevation of one form of the fuel apparatus of the invention mounted on an engine;

FIG. 2 is an enlarged fragmentary sectional view of the fuel apparatus shown in FIG. 1 taken along line 2—2 thereof;

FIG. 3 is a sectional view of the apparatus taken along line 3—3 of FIG. 2;

FIG. 4 is an enlarged side view of the fuel metering portion of the apparatus shown in FIG. 1; and FIG. 5 is a sectional view of the fuel metering portion shown in FIG. 4 taken along line 5—5 thereof.

As shown in the drawings, one form of the novel fuel apparatus 11 of the present invention is mounted on an engine 12 of a vehicle. The engine includes a carburetor 13, an air cleaner 14 and a fuel pump 15 connected to a fuel tank 16.

The fuel apparatus 11 of the invention is mounted along the length of an exhaust pipe 17 of the engine. The apparatus advantageously is mounted along a horizontal section of the exhaust pipe 17. The apparatus 11 is secured to the exhaust pipe sections 18 and 19 with suitable fasteners such as clamps 20.

The fuel apparatus 11 of the invention includes a housing portion 22, a fuel treating portion 23, a fuel metering portion 24 and a flow control portion 25. The housing portion 22 includes a main chamber 27, an upper expansion chamber 28, and first and second layer expansion chambers 29 and 30 respectively.

The main chamber 27 of the housing portion 22 includes an inlet 32 and an outlet 33. The inlet 32 is connectable to an exhaust gas source of an internal combustion engine such as exhaust pipe 17 of the engine 12. Outlet 33 of the housing portion 22 provides for the venting of exhaust gases from the main chamber 27 to the atmosphere through exhaust section 19.

The fuel treating portion 23 of the apparatus 11 includes first and second conduit coils 34 and 35. The coils 34 and 35 are disposed within the main chamber 27. Each of the conduit coils 34 and 35 includes an inlet and an outlet. Inlet 37 of the first coils 34 communicates with the first lower expansion chamber 29. Outlet 38 of the first coil 34 communicates with the second lower expansion chamber.

Inlet 39 of the second coil 35 communicates with the second lower expansion chamber 30 and outlet 40 of the second coil communicates with the upper expansion chamber 28.

Inlet means 42 are provided for delivering liquid fuel from a conduit 43 into the first lower expansion chamber 29. The inlet means 42 includes a vacuum source which may be the normal vacuum that is present when the engine 12 is operating. Also, inlet 42 includes means for bleeding a small amount of atmospheric air into a liquid fuel stream at a point adjacent to the inlet 42. This may be accomplished through an adjustable check valve 44 in conduit 43.

The conduit coils 34 and 35 advantageously are oriented along spaced parallel axes as shown in the drawings. Preferably, the coils are oriented about axes substantially perpendicular to the flow of exhaust gases through the main chamber 27. Most preferably, the coils 34 and 35 are positioned so the exhaust gases flow past the first coil 34 and then the second coil 35 in sequence.

Outlet means 46 are provided for delivering vaporized fuel from the upper expansion chamber 28. A conduit 47 connects outlet 46 with fuel metering portion 24.

The fuel metering portion 24 of the apparatus 11 of the invention includes a body section 50 with a bore 51 extending therethrough. The body section 50 includes an inlet 52 and an outlet 53. A rotatable member 54 extends into the bore 51. An external end section 55 of the rotatable member 54 is operatively connectable to carburetor controls such as linkage 56 of engine 12.

The fuel metering portion 24 advantageously is disposed adjacent the carburetor 13. As shown in the drawings, the fuel metering portion 24 is positioned within the cavity of the air cleaner 14 that is mounted on top of the carburetor 13. This arrangement does not increase the overall height of the engine and its accessories and thus does not create any space problems within the engine compartment.

In a preferred form of the fuel metering portion 24, body section 50 includes a throughbore 51 that extends from one side thereof to the other. A second bore 58 is disposed transversely of the throughbore 51 and communicates therewith. Also, rotatable member 54 extends into the throughbore 51 to a point adjacent the intersection thereof with the transverse bore 58. In addition, the rotatable member 54 includes an open section 59 adjacent the transverse bore 58. This open section 69 advantageously is a flat section adjacent the inside end of the rotatable member.

The flow control portion 25 of the apparatus 11 includes means for monitoring the flow of liquid fuel through conduit 43 and into first lower expansion chamber 29. The flow control portion may include a switch actuated valve 61 located in line 62 extending between fuel pump 15 and carburetor 13.

Advantageously, the second lower expansion chamber 30 is operatively connectable with fuel tank 16 of the engine 12. As shown, this may be through a float valve 63 disposed in a conduit 64 that connects the second lower expansion chamber with a conduit 65 connecting fuel tank 16 with fuel pump 15. This arrangement allows excess liquid fuel in the second lower expansion chamber to drain back into the tank 16.

In the use of the novel fuel apparatus 11 of the invention as shown in the drawings, the apparatus 11 first is installed on the engine 12. This is accomplished by removing a section of the exhaust pipe 17 of a length equal to the distance between the exhaust inlet 32 and the outlet 33. Then, the housing portion 22 of the apparatus 11 is positioned in the exhaust pipe 17 and secured to the pipe sections 18 and 19 with suitable fasteners such as clamps 20.

The fuel metering portion 24 is installed in the air cleaner 14 by removing the cover of the air cleaner and substituting the fuel metering portion of the rod that normally holds the cover and the air cleaner in position against the carburetor 13.

The apparatus 11 is operatively connected to the engine 12 by attaching conduit 47 between outlet 46 of the fuel treating portion 23 and inlet 52 of the fuel metering portion 24. Also, the outlet 53 of the fuel metering portion is connected to the vacuum side 67 of the carburetor 13. Further, conduit 64 from float valve 63 is connected into conduit 65 running between fuel tank 16 and fuel pump 15. In addition, valve 61 is inserted into line 62 extending between fuel pump 15 and carburetor 13. Conduit 43 then is connected between valve 61 and fuel inlet 42 of the apparatus. Also, end section 55 of rotatable member 54 is connected to the carburetor controls through linkage 56. The apparatus 11 of the invention now is ready for use.

A driver of a vehicle equipped with the apparatus 11 of the invention operates his vehicle in a normal manner without directing his attention to the apparatus since the apparatus functions automatically. When the driver starts a cold engine, valve 61 directs fuel along line 62 and into the carburetor to start the engine by closing off conduit 43.

The engine is operated with conventional fuel flow until the exhaust gases reach an elevated temperature. At this time, valve 61 is actuated, preferably automatically through a temperature controlled switch. Valve 61 closes line 62 and directs the fuel along conduit 43 into the apparatus 11.

Liquid fuel is drawn by vacuum from the carburetor through inlet 42 and into first lower expansion chamber 29. Movement of the fuel is facilitated by bleeding a small amount of air into the fuel stream with check valve 44. The fuel is drawn through the first coil 34 to begin vaporization thereof and then into second lower expansion chamber 30. From second lower expansion chamber 30, the partially vaporized fuel is drawn through second coil 35 for further vaporization and then into upper expansion chamber 28.

Any liquid remaining in the fuel after the heating thereof in the second coil 35 drains back in the second lower expansion chamber and therefrom into float valve 63 and conduits 64 and 65 back to fuel tank 16. This condition can occur both while the apparatus 11 is functioning and particularly when the engine is stopped.

The vaporized fuel from upper expansion chamber 28 passes through outlet 46 and conduit 47 to fuel metering portion 24. The fuel moves along bore 51 to the intersection thereof with transverse bore 58.

Since rotatable member 54 is operatively connected to carburetor linkage 56, depressing the accelerator (not shown) of the vehicle rotates member 54 and causes the vaporized fuel to be delivered from the metering portion into the carburetor 13. The fuel apparatus 11 continues to function in this way while the engine is operating.

When the engine is stopped, any fuel in the apparatus condenses and drains back through to the second lower expansion chamber 30. It then drains through the float valve 63 and conduits 64 and 65 to the fuel tank 16. This draining also can occur if the apparatus should accumulate excess liquid fuel during operation of the engine.

The above description and the accompanying drawings show that the present invention provides a novel fuel apparatus for reducing the fuel consumption of engines. The apparatus of the invention is suitable for use with different types of engines operating under a wide variety of conditions. The apparatus enhances power and reduces engine pollution while achieving fuel economy.

The fuel apparatus of the invention is relatively inexpensive to manufacture. Commercially available materials and components can be used in its fabrication. Conventional metal working techniques and procedures can be employed in its manufacture.

The apparatus can be installed easily by a mechanic after a minimum of instruction. The small size of the apparatus allows it to be mounted on an engine within the space limitations encountered under the hood of a vehicle. The apparatus is durable in construction and has a long useful life with a minimum of maintenance.

A vehicle operator can utilize the apparatus of the invention without changing his normal driving procedures. The apparatus can function automatically without supervision by the driver.

It will be apparent that various modifications can be made in the particular fuel apparatus described in detail above and shown in the drawings within the scope of the invention. The size, configuration and arrangement of components can be changed to meet specific requirements. The controls of the apparatus can be automatic or manual as desired and may include computers. These and other changes in the apparatus can be made provided the functioning and operation thereof are not adversely affected. Therefore, the scope of the invention is to be limited only by the following claims.

What is claimed is:

1. A fuel apparatus including a housing portion, a fuel treating portion, a fuel metering portion and a flow control portion; said housing portion including a main chamber, an upper expansion chamber and first and second lower expansion chambers, said main chamber including an inlet connectable to an exhaust gas source of an internal combustion engine, an outlet for venting said exhaust gas to the atmosphere; said fuel treating portion including first and second conduit coils disposed within said main chamber, each of said conduit coils including an inlet and an outlet, the inlet of said first coil communicating with said first lower expansion chamber and the outlet of said first coil communicating with said second lower expansion chamber, the inlet of said second coil communicating with said second lower expansion chamber and the outlet of said second coil communicating with said upper expansion chamber, inlet means for delivering liquid into said first lower expansion chamber, said inlet means including a vacuum source and means for bleeding a small amount of atmospheric air into a liquid fuel stream at a point adjacent to said inlet of the first lower expansion chamber, outlet means for delivering vaporized fuel from said upper expansion chamber; said fuel metering portion including a body section, a bore extending through said body section, a rotatable member extending into said bore, an external section of said rotatable member being operatively connectable to carburetor controls of said engine, a vaporized fuel inlet and an outlet communicating with said bore; said flow control portion including means for monitoring the flow of liquid fuel into said first lower expansion chamber.

2. Fuel apparatus according to claim 1 wherein said first and second coils are oriented along spaced parallel axes.

3. Fuel apparatus according to claim 2 wherein said coils are oriented about axes substantially perpendicular to the flow of exhaust gases through said main chamber.

4. Fuel apparatus according to claim 3 wherein said coils are positioned so the exhaust gases flow past said first coil and said second coil in sequence.

5. Fuel apparatus according to claim 1 wherein said second lower expansion chamber is connectable with a fuel tank of said engine.

6. Fuel apparatus according to claim 5 wherein said second lower expansion chamber communicates with said fuel tank through float valve means.

7. Fuel apparatus according to claim 1 wherein said fuel metering portion is disposed above said carburetor within said air filter of said engine.

8. Fuel apparatus according to claim 1 wherein said fuel metering portion includes a body section with a throughbore extending from one side thereof to the other and a second bore is disposed transversely of said throughbore and communicates therewith.

9. Fuel apparatus according to claim 8 wherein said rotatable member extends into said throughbore to a point adjacent to said transverse bore and said rotatable member includes an open section adjacent to said transverse bore.

10. Fuel apparatus according to claim 1 wherein said means for bleeding atmospheric air into a stream of liquid fuel includes means for adjusting the rate of air flow.

11. Fuel apparatus according to claim 1 wherein said flow control means includes switch actuated valve means for diverting said liquid fuel flow to said carburetor through said fuel apparatus.

* * * * *